United States Patent
Kane (10) Patent No.: US 9,423,307 B2
(45) Date of Patent: Aug. 23, 2016

(54) METHOD AND APPARATUS FOR DETERMINING WAVE CHARACTERISTICS USING INTERACTION WITH A KNOWN WAVE

(71) Applicant: Daniel James Kane, Santa Fe, NM (US)

(72) Inventor: Daniel James Kane, Santa Fe, NM (US)

(73) Assignee: Mesa Photonics, LLC, Santa Fe, NM (US)

( * ) Notice: Subject to any disclaimer, the term of this patent is extended or adjusted under 35 U.S.C. 154(b) by 652 days.

(21) Appl. No.: 13/771,732

(22) Filed: Feb. 20, 2013

(65) Prior Publication Data

US 2014/0237014 A1    Aug. 21, 2014

(51) Int. Cl.
*G01J 11/00* (2006.01)

(52) U.S. Cl.
CPC ...................................... *G01J 11/00* (2013.01)

(58) Field of Classification Search
None
See application file for complete search history.

(56) References Cited

U.S. PATENT DOCUMENTS

| | | | |
|---|---|---|---|
| 5,367,375 A | 11/1994 | Siebert | |
| 5,530,544 A | 6/1996 | Trebino et al. | |
| 5,754,292 A | 5/1998 | Kane et al. | |
| 6,008,899 A | 12/1999 | Trebino et al. | |
| 6,219,142 B1 | 4/2001 | Kane | |
| 6,801,318 B2 * | 10/2004 | Fu | G01J 9/02 356/450 |
| 6,885,442 B1 | 4/2005 | Nugent et al. | |
| 7,039,553 B2 | 5/2006 | Nugent et al. | |
| 7,130,052 B1 | 10/2006 | Kane | |
| 7,493,227 B2 | 2/2009 | Ozcan et al. | |
| 7,630,873 B2 | 12/2009 | Bischoff et al. | |
| 8,068,230 B2 | 11/2011 | Kane | |
| 8,082,117 B2 | 12/2011 | Ozcan et al. | |
| 2004/0257578 A1* | 12/2004 | Kane | G01J 11/00 356/450 |

OTHER PUBLICATIONS

R. Trebino, "Frequency-Resolved Optical Gating: The Measurement of Ultrashort Laser Pulses: The Measurement of Ultrashort Laser Pulses", Springer Science & Business Media, pp. 313-366, 2000.*
D. T. Reid, P. Loza-Alvarez, C. T. A. Brown, T. Beddard, W. Sibbett, "Amplitude and phase measurement of mid-infrared femtosecond pulses by using cross-correlation frequency-resolved optical gating," Opt. Lett. 25, pp. 1478-1480, 2000.*
S. Linden, H. Giessen, and J. Kuhl, "XFROG—a new method for amplitude and phase characterization of weak ultrashort pulses," Phys. Status Solidi B, 206, 119-124 (1998).
Daniel W. Griffin and Jae S. Lim, "Signal Estimation from Modified Short-Time Fourier Transform,"IEEE Trans. Acoust., Speech, Signal Processing, ASSP-32, 236-243 (1983).
C. Dorrer, I. Kang, "Real-Time Implementation of Linear Spectrograms for the Characterization of High Bit-Rate Optical Pulse Trains," IEEE Photon. Technol. Lett., 16, 858-860.
D. J. Kane, et al., "Simultaneous measurement of two ultrashort laser pulses from a single spectrogram in a single shot," J. Opt. Soc. A, 14, 935-943, (1997).

(Continued)

*Primary Examiner* — Matthew Sandifer (57) ABSTRACT

The described system and method uses data from interaction between a known wave and an unknown wave to analyze or characterize the unknown wave using cross correlation frequency resolved optical gating (X-FROG). The system may obtain X-FROG trace data from the interaction between the two waves. The system analyzes the X-FROG trace data using a modified principal component generalized projection method strategy to invert the X-FROG trace data, analyzing or characterizing the unknown wave. Results of the analysis can be provided in real time and displayed.

27 Claims, 7 Drawing Sheets

(56) References Cited

OTHER PUBLICATIONS

D. J. Kane, "Recent progress toward real-time measurement of ultrashort laser pulses," IEEE J. Quantum Electron., 35, 421-431, (1999).

D. T. Reid, et al., "Amplitude and phase measurement of mid-infrared femtosecond pulses by using cross-correlation frequency-resolved . . . ," Opt. Lett., 25 1478-1480 (2000).

E. B. Treacy, "Measurement and interpretation of dynamic spectrograms of picosecond light pulses," J. Appl. Phys. 42, 3848-3858 (1971).

Chilla and Martinez, "Direct determination of the amplitude and the phase of femtosecond light pulses," Opt. Lett. 16, 39-41 (1991).

R. Trebino, et al., "Measuring ultrashort laser pulses in the time-frequency domain using frequency-resolved optical gating", Rev. Sci Instrum., 68, p. 3277 (1997).

Horn and Johnson, Matrix Analysis, Cambridge University Press, p. 427-435 (1985).

J. Dudley, et al., "Cross-correlation frequency resolved optical gating analysis of broadband continuum generation in photonic crystal fibe . . . " Opt. Ex. 10, 1215-1221 (2002).

Jiang, et al., "Optical arbitrary waveform characterization using linear spectrograms", 283, 3017-3021 (2010).

Daniel J. Kane, "Principal components generalized projections: a review [Invited]," J. Opt. Soc. Am. B 25, (2008).

Y. Mairesse, F. Quere, "Frequency-resolved optical gating for complete reconstruction of attosecond bursts," 71, 011401(R) (2005).

D. J. Kane, et al., "Real-time inversion of polarization gate frequency-resolved optical gating spectrograms," Appl. Opt. 42, 1140-1144 (2003).

R. Trebino, "Using phase retrieval to measure the intensity and phase of ultrashort pulses: frequency-resolved optical gating," J. Opt. Soc. Am. A 10, 1101-1111 (1993).

D. J. Kane, "Real-Time Measurement of Ultrashort Laser Pulses Using Principal Component Generalized Projections," IEEE J. Selec. Topics Quant. Elec. 4, 278-284 (1998).

D. J. Kane, "Convergence test for inversion of frequency-resolved optical gating spectrograms," Opt. Lett. 25, 1216-1218 (2000).

K. W. Delong et al., "Pulse retrieval in frequency-resolved optical gating based on the method of generalized projections," Opt. Lett. 19, 2152-2154 (1994).

K. W. Delong et al., "Improved ultrashort pulse-retrieval algorithm for frequency-resolved optical gating", J. Opt. Soc. Am. A 11, 2429-2437 (1994).

C. Dorrer, I. Kang, "Simultaneous temporal characterization of telecommunication optical pulses and modulators by use of spectrograms", Opt. Lett. 27, 1315-1317 (2002).

Gu et al., "Frequency-resolved optical gating and single-shot spectral measurements reveal fine structure in microstructure-fiber continuum", Opt. Lett. 27, 1174-1176 (2002).

X. G. Xu et al., "Complete characterization of molecular vibration using frequency resolved gating," J. Chem. Phys. 126, 091102 (2007).

Daniel J. Kane, "New simplified, algorithm for cross-correlation frequency resolved optical gating," Proc. SPIE 8611, 86110Q (Mar. 15, 2013).

* cited by examiner

METHOD AND APPARATUS FOR DETERMINING WAVE CHARACTERISTICS USING INTERACTION WITH A KNOWN WAVE

GOVERNMENT RIGHTS

The U.S. Government has a paid-up license in this invention and the right in limited circumstances to require the patent owner to license others on reasonable terms as provided for by the terms of Grant No. DOE DE-SC0006495.

BACKGROUND OF THE INVENTION

1. Field of the Invention

The present invention relates to a method and apparatus for phase retrieval in wave phenomenon and may be used to provide multi-dimensional ultrafast laser diagnostics, among other applications.

2. Background

Interference phenomena are produced through the interaction of at least two spatially distinguishable waves. Sometimes diffraction and interference are not clearly distinguished. Interference occurs when two or more wavefronts interact while diffraction occurs naturally when a single wave is limited in some way. The nature of an interference pattern depends on several factors including the amplitudes and phases of the incoming waves. If the incoming waves are in phase, then the amplitude of the waves may add (constructive interference) whereas, if the phases of the incoming waves are separated by 180 degrees, then cancellation may result (destructive interference). For example, if light from a single laser is split to produce two separate beams and directed along two different paths, then it is likely that the beams will no longer be in phase or phase coherent. If the two beams are then recombined, the result will be an interference pattern. In some instances, it is helpful to detect the interference pattern as an image in a plane or on a planar surface. The interference pattern can also be captured as intensity (absolute value of amplitude squared) versus time in a two-dimensional detector. The intensity versus time patterns resulting from the interference between the two beams can be reconstructed if the system knows the individual frequency components, i.e., amplitudes and phases of the interference patterns.

Phase differences in the interference waves can be represented as shifts in origin. For example, the Fourier transform of a function $f(x)$ (which converts a wave from amplitude as a function of time or space to amplitude as a function of frequency) is as follows:

$$F(k) = \int f(x) \exp(-ikx) dx \quad (1)$$

where the limits on the integral are from $x=-\infty$ to $x=+\infty$. When the origin or phase is shifted, the Fourier transform is represented as, $$F_1(k) = \int f(x-x_0) \exp(-ikx) dx \quad (2)$$

or as, $$F_1(k) = F(k) \exp(-ikx_0). \quad (3)$$

Thus, the form of the Fourier transform differs only by the phase factor $\exp(-ikx_0)$, remembering that the amplitudes $|F_1(k)|$ and $|F(k)|$ and the intensity, the amplitudes squared, are equal. In many wave problems the function $f(x)$ is complex, i.e., $f(x) = \text{Re}[f(x)] + i\text{Im}[f(x)]$, and the transforms are of complex functions. A plane wave has a wavefront in a plane of constant phase normal to the direction of propagation. A plane wave may be written as $$E = E_0 \exp(-i\omega t). \quad (4)$$

In equation 4, the wave is represented as E, as a function of time, where the frequency characteristics are captured in the exponential term. In Equation 4, the amplitude is at a maximum at $t=0$.

If phase information for two interfering pulses is not known ahead of time, then the plot of intensity versus time of the interfering pulses does not uniquely define a set of frequencies and amplitudes for the pulses. There is not enough information in the intensity versus time plot alone to be able to reconstruct the phase of the original pulses. Determining the phase in these types of problems is referred to as phase retrieval. The phase retrieval problem is similar to solving a single equation for two unknowns—many solutions exist. Phase retrieval analysis often imposes a constraint, i.e., an additional equation, to overcome this problem. Typically the phase retrieval analysis selects a physically reasonable constraint that leads to a unique solution. The type of constraint depends on the application. In most crystallographic applications, the analysis typically applies a symmetry condition to the outer bounds of the measured region. Such constraints benefit from prior knowledge of the way atoms are arranged in a crystalline structure. Analysis of other applications requires that other constraints be found to facilitate phase retrieval.

Solution of phase retrieval problems starts with an initial estimate of the phase. Often the guess is not so critical and any reasonable starting point can be used to obtain a solution. Of course, because many of the phase retrieval techniques use iterative processes, a more reasonable guess typically results in fewer iterations in arriving at a unique solution.

One class of phase retrieval problems is known as reconstruction from multiple Fourier intensities (RMI). This problem involves the reconstruction of two functions from multiple Fourier intensities of the product based on relative displacements of the two functions. The solutions to this class of problems have significant applications to situations where the intensity of the Fourier transform of the product of two functions is recorded for multiple relative displacements of the functions including transmission microscopy (optical, electron, and x-ray) and ultrafast laser diagnostics. For example, in the field of ultrafast laser diagnostics, the solution to the RMI problem is known as a frequency-resolved optical gating (FROG) trace inversion, spectrogram inversion, or sonogram inversion and can be used to find the intensity and phase of an ultrashort laser pulse. In the FROG example (see FIG. 1), the system scans a gate pulse in time across a pulse to be measured. For each time delay, the spectrum of the pulse that results from a well-defined nonlinear interaction of these two pulses is recorded. The nonlinear interaction produces the product (multiplication) of the gate and pulse. The resulting spectrogram, or FROG trace, is a plot of intensity versus time and frequency of the pulse. It is only possible to obtain intensity information of the spectrum. Consequently, the key characteristics of the pulse, the intensity and phase, cannot be obtained directly from this plot. An iterative two-dimensional phase retrieval method can be used to find the phase in order to extract the functions, and hence, the pulse characteristics from the spectrogram. Current two-dimensional phase retrieval methods require a priori knowledge of the gate function or they are slow and cumbersome, requiring large amounts of computational power. There is a need for fast inversion methods for ultrashort pulse measurement devices, and the same method will be generally applicable to other fields. Indeed, even though inversion techniques exist for spectrograms and sonograms when the gate is known, there is still a need for fast, simple inversion methods for situations where the gate is known—especially for ultrafast laser diagnostics.

Ultrafast laser systems have a large number of applications in biochemistry, chemistry, physics, and electrical engineering. These systems generate laser pulses with durations of ten picoseconds or less and are used to explore kinetics in proteins, examine carrier relaxation in semiconductors, or image through turbid media. They are also used as an ultrafast probe in electronic circuits. By using ultrafast diagnostic systems, highly advanced semiconductors, electronic circuitry, and even biomedical products can be developed and tested for commercial applications. New applications requiring shaped ultrashort pulses in both intensity and phase such as coherent control of chemical reactions are being developed. The continued development of these applications will require fast, high quality and easy-to-use ultrafast laser pulse diagnostics.

FROG is an ultrafast laser diagnostic that is used to measure the intensity and phase of an ultrashort laser pulse. In a simple form, FROG produces a spectrogram of the pulse that is a three-dimensional plot of intensity versus frequency and time delay, showing the spectral components of time slices of the pulse. While the spectrogram of the pulse serves as an intuitive display of the pulse, it is difficult to obtain quantitative information about the pulse from the spectrogram, and subtleties in the pulse structure may go unnoticed without knowledge of the actual pulse. To obtain the original pulse from its spectrogram, the phase of the spectrogram must be determined requiring a two-dimensional phase retrieval computation. This mathematical step—which converts the measured spectrogram into two-dimensional plots of pulse duration and chirp—is the slowest step in existing FROG instrumentation. While it is possible to characterize an individual femtosecond pulse, the data analysis step might take sixteen-orders of magnitude longer than the duration of the pulse itself. A simple error analysis may take hours. More than just faster computers is needed to invert FROG traces in real time.

The development of techniques for ultrashort pulse measurement, that is, the profiling of the electric field envelope and the instantaneous frequency, has been difficult. Early methods yielded only the intensity autocorrelation of the pulse. Later developments, such as interferometric autocorrelation, achieved the indirect determination of various phase distortions common to ultrashort pulses, but complete intensity and phase information about the pulse remains difficult to obtain. Some work has been done to extract the time-dependent intensity I(t) and the phase φ(t) (or, essentially equivalent to the phase, the instantaneous frequency ω(t)), from these traces using iterative methods.

Fundamental inherent ambiguities, including the direction of time, remain. It is therefore not possible to determine, for example, the sign of the chirp, unless a second measurement is made after pulse propagation through a known dispersive medium. Other methods yield only I(t) or require a streak camera and hence lack sufficient temporal resolution. Still other methods have been developed to measure the phase ω(t) but do not yield the intensity. Simultaneous time and frequency information is required for retrieval of the full complex electric field.

Time-frequency measurements of ultrashort pulses were first completed by Treacy in 1971. The Treacy method disperses the input pulse in frequency, selects a portion of the frequency components to produce another pulse, then cross correlates the newly formed pulse with the original input pulse. By scanning the frequency filter over all of the frequencies contained in the original pulse, a three-dimensional plot of intensity versus frequency and time is produced which is commonly referred to as a sonogram. This method was refined by Chilla and Martinez with the development of frequency domain phase measurement or FDPM. Since the arrival time (i.e., the peak) of each frequency filtered pulse is given by the derivative of the phase (in the frequency domain) with respect to frequency, integration of arrival time of each pulse with respect to frequency gives the phase of the pulse in the frequency domain. Coupling this result with the spectrum of the pulse gives the Fourier transform of the complex electric field. The principal difficulty with this method is that if the peak of the arrival time of each frequency selected pulse does not produce a function, as is the case with self-phase modulated pulses, the group delay is not well defined and characterization of the pulse is not possible.

Spectrograms are close relatives to sonograms. Rather than displaying the time arrival of frequency filtered pulses, a spectrogram displays the frequency content of time slices of a pulse. FROG uses optical methods to obtain a spectrogram of the pulse to be measured to completely characterize ultrashort laser pulses. FROG can be used in either multi-shot or single shot geometries. A gate pulse, which can be virtually any duration, slices out portions of a probe pulse in the time domain using either an instantaneously responding nonlinear material or a nearly instantaneously responding medium. The sampled portion of the probe, or signal, is dispersed in a spectrometer. Like a sonogram, the resulting spectrogram contains all the intensity and phase information about the probe pulse.

Obtaining the spectrogram of a pulse is experimentally less complex than obtaining the sonogram; however, extracting the intensity and phase of a pulse from its spectrogram is mathematically more challenging. If an approach similar to that of Chilla and Martinez is used to invert a spectrogram, the phase in the time domain is obtained, but the complete complex electric field is not. Since only the magnitude of the spectrogram can be measured, finding the full intensity and phase of the input pulse requires determining the spectrogram's phase, placing the FROG inversion problem into the category of two-dimensional phase retrieval problems.

Mathematical Representation of an Optical Pulse

The discussion now reviews the mathematical representation of ultrashort optical pulses to provide background. A pulse's electric field, A(t), can be written:

$$A(t)=Re[E(t)e^{i\omega_0 t}] \quad (5)$$

where $\omega_0$ is the carrier frequency and Re refers to the real part. A(t) can be used in this form for calculations, but it is generally easier to work with a different representation that removes the rapidly varying $\omega_0$ part, $e^{i\omega_0 t}$, and uses as a representation a slowly varying envelope together with a phase term that contains only the frequency variations. This representation, which does not include the rapidly varying carrier frequency, is $$E(t)=[I(t)]^{1/2}e^{i\phi(t)} \quad (6)$$

where I(t) and φ(t) are the time-dependent intensity and phase of the pulse. (E(t) is complex.) The frequency variation, Ω(t), is the derivative of φ(t) with respect to time:

$$\Omega(t)=-d\phi(t)/dt \quad (7)$$

The pulse field can be written equally well in the frequency domain by taking the Fourier transform of equation 6:

$$\tilde{E}(\omega)=[\tilde{I}(\omega)]^{1/2}e^{-i\phi(\omega)} \quad (8)$$

where $\tilde{I}(\omega)$ is the spectrum of the pulse and φ(ω) is its phase in the frequency domain. The spectral phase contains time versus frequency information. That is, the derivative of the spectral phase with respect to frequency yields the time arrival of the frequency, or the group delay.

Obtaining the intensity and phase, I(t) and ϕ(t) (or $\tilde{I}(\omega)$ and ϕ(ω)) is called full characterization of the pulse. Common phase distortions include linear chirping, where the phase (either in the time domain or frequency domain) is parabolic. When the frequency increases with time, the pulse is said to have positive linear chirp; negative linear chirp is when the high frequencies lead the lower frequencies. Higher order chirps are common, but for these, differentiation between spectral and temporal chirp is required because spectral phase and temporal phase are not interchangeable.

Frequency-Resolved Optical Gating

Figure 1:
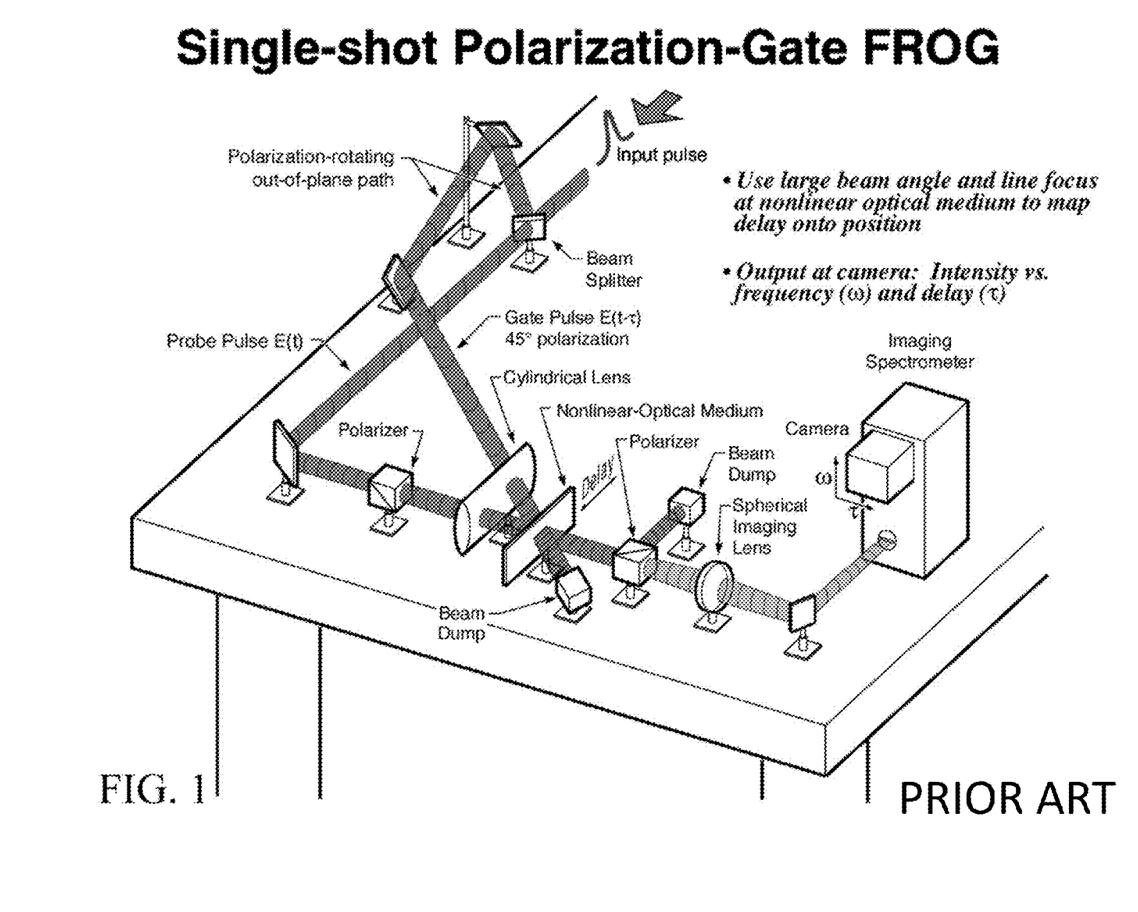
FIG. 1 illustrates that measuring the spectrogram of a pulse is easier than measuring its sonogram. A spectrogram is a spectrally resolved autocorrelation. In this figure, the optical Kerr-effect is used (polarization-gate) as the non-linearity.

Frequency-resolved optical gating (FROG) measures, as shown in FIG. 1, the spectrum of a particular temporal component of an optical pulse by spectrally resolving the signal pulse in an autocorrelation-type experiment using an instantaneously responding nonlinear medium. As shown in FIG. 1, FROG involves splitting a pulse and then overlapping the two resulting pulses in an instantaneously responding $\chi^{(3)}$ or $\chi^{(2)}$ medium. Any medium that provides an instantaneous nonlinear interaction may be used to implement FROG. Perhaps the most intuitive is a medium and configuration that provides polarization gating.

For a typical polarization-gating configuration, induced birefringence due to the electronic Kerr effect is the nonlinear-optical interaction. The "gate" pulse causes the $\chi^{(3)}$ medium, which is placed between two crossed polarizers, to become slightly birefringent. The polarization of the "gated" probe pulse (which is cleaned up by passing through the first polarizer) is rotated slightly by the induced birefringence, allowing some of the "gated" pulse to leak through the second polarizer. This is referred to as the signal. Because most of the signal emanates from the region of temporal overlap between the gate pulse and the probe pulse, the signal pulse contains the frequencies of the "gated" probe pulse within this overlap region. The signal is then spectrally resolved, and the signal intensity is measured as a function of wavelength and delay time τ. The resulting trace of intensity versus delay and frequency is a spectrogram, a time- and frequency-resolved transform that intuitively displays the time-dependent spectral information of a waveform.

The resulting spectrogram can be expressed as:

$$S_E(\omega,\tau)=|\int_{-\infty}^{\infty}E(t)g(t-\tau)e^{-i\omega t}dt|^2 \quad (9)$$

where E(t) is the measured pulse's electric field, g(t−τ) is the variable-delay gate pulse, and the subscript E on $S_E$ indicates the spectrogram's dependence on E(t). The gate pulse g(t) is usually somewhat shorter in length than the pulse to be measured, but not infinitely short. This is an important point: an infinitely short gate pulse yields only the intensity I(t) and conversely a CW gate yields only the spectrum I(ω). On the other hand, a finite-length gate pulse yields the spectrum of all of the finite pulse segments with duration equal to that of the gate. While the phase information remains lacking in each of these short-time spectra, having spectra of an infinitely large set of pulse segments compensates this deficiency. The spectrogram nearly uniquely determines both the intensity I(t) and phase ϕ(t) of the pulse, even if the gate pulse is longer than the pulse to be measured. If the gate is too long, sensitivity to noise and other practical problems arise.

In FROG, when using optically induced birefringence as the nonlinear effect, the signal pulse is given by:

$$E_{sig}(t,\tau) \propto E(t)|E(t-\tau)|^2 \quad (10)$$

So the measured signal intensity $I_{FROG}(\omega,\tau)$, after the spectrometer is:

$$I_{FROG}(\omega,\tau)=|\int_{-\infty}^{\infty}E(t)|E(t-\tau)|^2 e^{-i\omega t}dt|^2 \quad (11)$$

The FROG trace is thus a spectrogram of the pulse E(t) although the gate, $|E(t-\tau)|^2$, is a function of the pulse itself.

Figure 2:
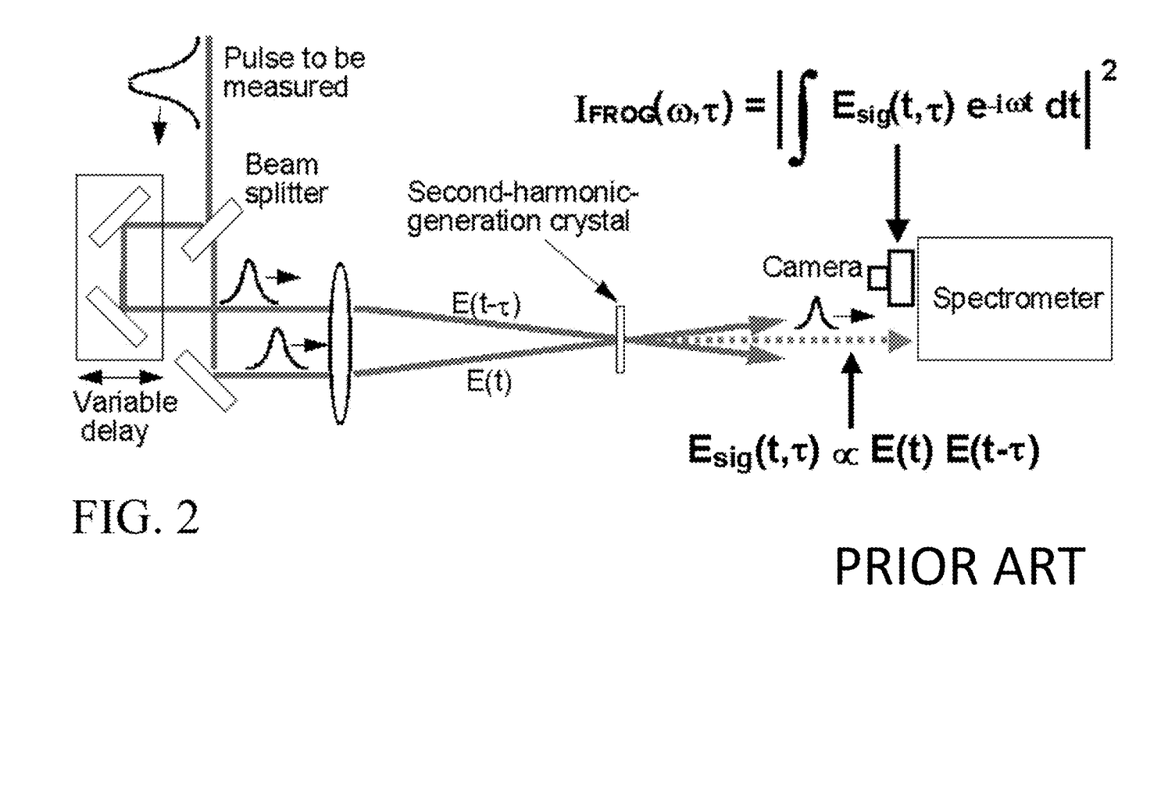
FIG. 2 shows schematically an SHG FROG device. The SHG signal from the autocorrelation is spectrally resolved. SHG FROG is very simple and sensitive, but has a direction-of-time ambiguity. For example, if the pulse has chirp, only the magnitude of the chirp is determined and the sign of the chirp remains unknown.

FROG is not limited to the optical Kerr effect. Second harmonic generation (SHG) FROG can be constructed to analyze relatively weak pulses from oscillators and is typically more sensitive than polarization-gating FROG. For SHG FROG, the pulse is combined with a replica of itself in an SHG crystal as illustrated in FIG. 2.

To see that the FROG trace essentially uniquely determines E(t) for an arbitrary pulse, note that E(t) is easily obtained from $E_{sig}(t, \tau)$. Equation (11) can then be written in terms of $E_{sig}(t, \Omega)$, the Fourier transform of the signal field $E_{sig}(t, \tau)$ with respect to delay variable τ. This gives the following, apparently more complex, expression:

$$I_{FROG}(\omega,\tau)=|\int_{-\infty}^{\infty}E_{sig}(t,\Omega)e^{-i\omega t-i\Omega\tau}dtd\Omega|^2 \quad (12)$$

Equation (12) indicates that the problem of inverting the FROG trace $I_{FROG}(\omega,\tau)$ to find the desired quantity $E_{sig}(t, \tau)$ is that of inverting the squared magnitude of the two-dimensional Fourier transform of $E_{sig}(t, \tau)$, which is the two-dimensional phase-retrieval problem discussed above. At first glance, this problem appears unsolvable; after all, much information is lost when the magnitude is taken. The one dimensional phase retrieval problem is known to be unsolvable (for example, infinitely many pulse fields give rise to the same spectrum). Intuition fails badly in this case, however. Two- and higher-dimension phase retrieval processes essentially always yield unique results.

FROG Inversion

Figure 3:
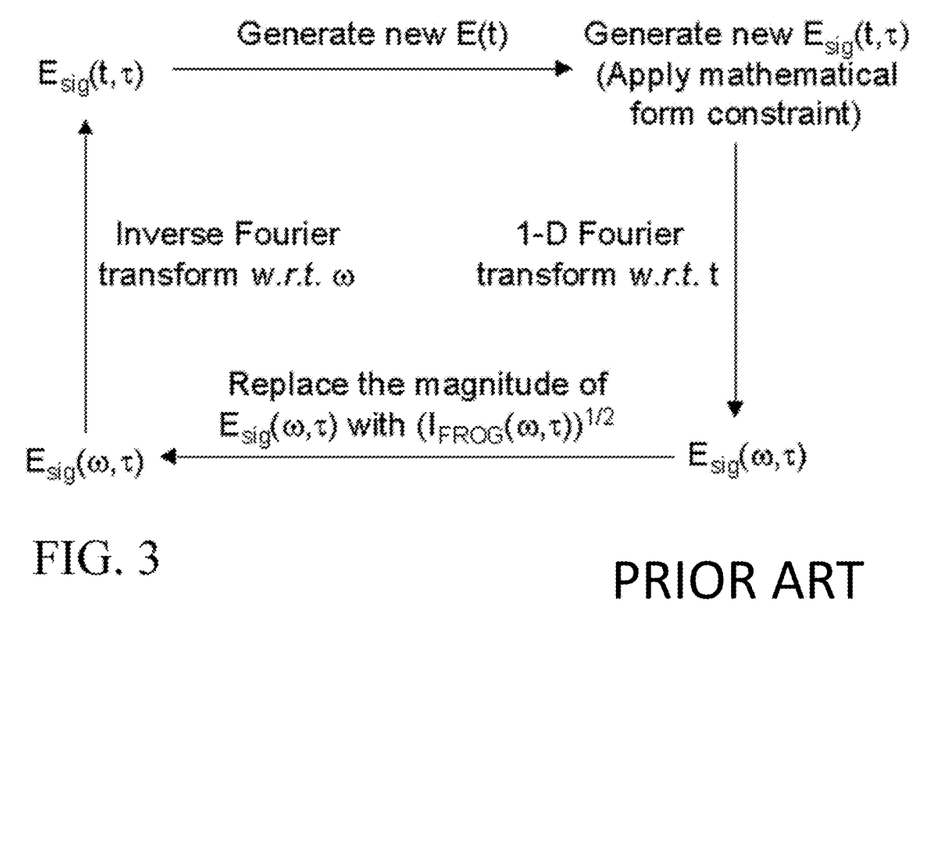
FIG. 3 illustrates phase retrieval processes for the inversion of FROG spectrograms that start with an initial guess for the pulse to generate an initial $E_{sig}(t,\tau)$. A one dimensional Fourier transform generates the FROG trace. The process continues by replacing the magnitude of the calculated FROG trace with the square root of the measured FROG trace. The process takes the inverse Fourier transform with respect to $\omega$ to produce the new signal field and generate a new start value for $E(t)$. Interestingly, it is only the process that produces $E(t)$ from $E_{sig}(t,\tau)$ that differentiates all the FROG implementations.

An iterative two-dimensional phase retrieval process is used to extract the pulse information from the measured FROG trace as illustrated generally in FIG. 3. This phase retrieval process converges to a pulse that minimizes the difference between the measured and the calculated FROG trace. Application of this phase retrieval process to FROG has been problematic in the past. Some recent applications use a generalized projections algorithm, which converges quickly, along with faster computers, to track pulse changes at rates of 20 Hz or greater, making FROG a real-time pulse measurement technique. Indeed, programs for analyzing FROG traces in this manner are commercially available.

The original FROG inversion process, using what is commonly referred to as the vanilla algorithm, is simple and iterates quickly. On the other hand, the process tends to stagnate and give erroneous results, especially for geometries that use a complex gate function such as SHG or self-diffraction. Improved strategies using different algorithms, including brute force minimization, were developed to avoid stagnation, at the expense of both iteration speed and convergence time. Later a numerical technique called generalized projections brought a significant advance in both speed and stability. The generalized projections technique proceeds after an iteration by constructing a projection that minimizes the error (distance) between the FROG electric field, $E_{sig}(t, \tau)$, obtained immediately after the application of the intensity constraint, and the FROG electric field calculated from the mathematical form constraint. The projection constructed in this manner is used as the starting point of the next iteration.

The first implementations of the generalized projections technique used a standard minimization procedure to find the electric field for the next iteration (which can still be slow). For the most common FROG geometries, PG and SHG, there are substantial advantages to a different strategy that directly determines the starting point for the next iteration. This strategy, called principal components generalized projections (PCGP), converts the generalized projections technique into an eigenvector problem. The PCGP technique has achieved pulse characterization rates of 20 Hz.

The goal of phase retrieval is to find the E(t) that satisfies two constraints. The first constraint is the FROG trace itself which is the magnitude squared of the one dimensional Fourier transform of $E_{sig}(t,\tau)$:

$$I_{FROG}(\omega,\tau) = |\int_{-\infty}^{\infty} E_{sig}(t,\tau)e^{-i\omega t}dt|^2 \quad (13)$$

The other constraint is the mathematical form of the signal field, $E_{sig}(t,\tau)$, for the nonlinear interaction used. The mathematical forms for a variety of FROG beam geometries are:

$$E_{sig}(t,\tau) \propto \begin{cases} E(t)|E(t-\tau)|^2 & PG\text{ FROG} \\ E(t)^2 E^*(t-\tau) & SD\text{ FROG} \\ E(t)E(t-\tau) & SHG\text{ FROG} \\ E(t)^2 E(t-\tau) & THG\text{ FROG} \end{cases} \quad (14)$$

where PG is polarization gate, SD is self-diffraction, SHG is second harmonic generation and THG is third harmonic generation FROG.

All FROG implementations work by iterating between two different data sets: the set of all signal fields that satisfy the data constraint, $I_{FROG}(\omega,\tau)$, and the set of all signal fields that satisfy equation 14. The difference between FROG implementations is how the iteration between the two sets is completed. In the case of generalized projections, the E(t)'s are chosen such that the distance between the E(t) on the magnitude set and the E(t) on the mathematical form set is minimized. This is accomplished by minimizing the following equation:

$$Z = \sum_{i,j=1}^{N} |E_{sig(DC)}^{(k)}(t_i,\tau_j) - E_{sig(MF)}^{(k+1)}(t_i,\tau_j)|^2 \quad (15)$$

where $E_{sig(DC)}^{(k)}(t_i,\tau_j)$ is the signal field generated by the data constraint, and $E_{sig(MF)}^{(k+1)}(t_i,\tau_j)$ is the signal field produced from one of the beam geometry equations 14. For the normal generalized projections technique, the minimization proceeds using a standard steepest decent algorithm; the derivative of Z with respect to the signal field is computed to determine the direction of the minimum. The computation of the derivatives is tedious; the derivatives are tabulated in, for example, Trebino, et al., *Rev. Sci Instrum.*, 68, p. 3277 (1997).

An alternative to the minimization of equation 15 is principal components generalized projections (PCGP). PCGP computes the starting point of the next iteration through an eigenvector problem, reducing the computation for the next iteration to simple matrix-vector multiplies. PCGP works for both the PG and SHG beam geometries, is simple to program and is fast, as described in D. J. Kane, *IEEE J. Quant. Elec.*, (1999), and was used in the initial implementations of real-time FROG.

It is instructive to examine the PCGP strategy in detail to establish simplifying nomenclature. The PCGP strategy is based on the idea that FROG traces can be constructed from the outer product of two discrete vector pairs. Two vectors of length N are used to represent the probe and the gate fields:

$$E_{Probe} = [E_1, E_2, E_3, E_4, \ldots, E_N]$$

$$E_{Gate} = [G_1, G_2, G_3, G_4, \ldots, G_N] \quad (16)$$

The outer product of $E_{Probe}$ and $E_{Gate}$ is:

$$\begin{bmatrix} E_1 G_1 & E_1 G_2 & E_1 G_3 & E_1 G_4 & \ldots & E_1 G_N \\ E_2 G_1 & E_2 G_2 & E_2 G_3 & E_2 G_4 & \ldots & E_2 G_N \\ E_3 G_1 & E_3 G_2 & E_3 G_3 & E_3 G_4 & \ldots & E_3 G_N \\ E_4 G_1 & E_4 G_2 & E_4 G_3 & E_4 G_4 & \ldots & E_4 G_N \\ \vdots & \vdots & \vdots & \vdots & \vdots & \vdots \\ E_N G_1 & E_N G_2 & E_N G_3 & E_N G_4 & \ldots & E_N G_N \end{bmatrix} \quad (17)$$

This is referred to as the outer product form.

The rows of the outer product form are manipulated to generate an equivalent matrix that gives a time domain representation of a FROG trace. By leaving the first row unshifted and by shifting subsequent rows to the left, the following matrix results:

$$\begin{bmatrix} E_1 G_1 & E_1 G_2 & E_1 G_3 & \ldots & E_1 G_{N-2} & E_1 G_{N-1} & E_1 G_N \\ E_2 G_2 & E_2 G_3 & E_2 G_4 & \ldots & E_2 G_{N-1} & E_2 G_N & E_2 G_1 \\ E_3 G_3 & E_3 G_4 & E_3 G_5 & \ldots & E_3 G_N & E_3 G_1 & E_3 G_2 \\ E_4 G_4 & E_4 G_5 & E_4 G_6 & \ldots & E_4 G_1 & E_4 G_2 & E_4 G_3 \\ \vdots & \vdots & \vdots & \vdots & \vdots & \vdots & \vdots \\ E_N G_N & E_N G_1 & E_N G_2 & \ldots & E_N G_{N-3} & E_N G_{N-2} & E_N G_{N-1} \end{bmatrix} \quad (18)$$

$$\tau=0 \quad \tau=-1 \quad \tau=-2 \quad \ldots \quad \tau=+3 \quad \tau=+2 \quad \tau=+1$$

The $\tau=0$ column is the first column, where $\tau$ is the time delay in resolution element number (column number), which is just the probe multiplied by the gate with no time shift between them. The next column is the $\tau=-1$ column where the gate is delayed relative to the probe by one resolution element. After some column manipulation the most negative $\tau$ is on the left and the most positive on the right; this time domain FROG trace is the discrete version of the product $E_{Probe}(t)E_{Gate}(t-\tau)$. The columns are constant in $\tau$ (relative delay time) while the rows are constant in t (time). To obtain the FROG trace, the PCGP process obtains the Fourier transform of the product $E_{Probe}(t)E_{Gate}(t-\tau)$ with respect to t. Each column of the matrix shown in equation 18 is Fourier transformed using a fast Fourier transform (FFT) or other suitable method. The final step of squaring the magnitude of the complex result produces the FROG trace.

Any invertible transform may be used in the PCGP process, but the most common invertible transform used is the Fourier transform. The PCGP process is also not limited to squaring of the magnitude of the complex result, or obtaining the magnitude of the complex result.

While there are an infinite number of complex images that have the same magnitude as the FROG trace to invert, there is only one image that is formed by the outer product of a single pair of vectors that has the same magnitude as the FROG trace to invert. Like other two-dimensional phase retrieval methods, a PCGP system uses an iterative method (FIG. 3) to find the proper vector pair. The PCGP process makes an initial guess for the phase of the FROG trace, and the result is decomposed into outer products. The principal pair of vectors is kept and used to determine the next guess of the FROG trace phase.

To construct the initial guess for the phase, a PCGP strategy constructs a FROG trace using vector pairs, one complex (probe) and, in the case of polarization-gate FROG, one real (gate), that are random noise modulated by a broad Gaussian pulse. The iterative method is started by replacing the magnitude of the newly constructed FROG trace by the square root of the magnitude of the experimental FROG trace.

The PCGP system converts the FROG trace with the correct magnitude to the time-domain FROG trace using an inverse Fourier transform by column (see FIG. 3). Next, the system converts the time-domain FROG trace to the outer product form, equation 17. If the intensity and phase of the FROG trace are correct, this matrix, which we will call O, is a matrix of rank 1. That is, $OO^T$ and $O^TO$, where the superscript T refers to a transpose, has one and only one non-zero eigenvalue, which is the singular value of O.

The problem of producing the next best guess is solved using an elegant numerical method in linear algebra called singular value decomposition (SVD). SVD decomposes a matrix into a superposition of outer products of vectors. This can be written as:

$$O = U \times W \times V^T \qquad (19)$$

where U and $V^T$ are orthogonal (unitary, if they are complex) square matrices and W is a square diagonal matrix. Since both U and V are orthogonal, the column vectors of these matrices are all orthogonal and form an orthonormal basis set that describes the range of matrix O. Thus, the matrix O, the outer product form, is decomposed into a superposition of outer products between "probe" vectors (columns of U) and "gate" vectors (rows of $V^T$). The diagonal values in W (the only non-zero elements of W) determine the relative weights of each outer product and, therefore, how much each outer product contributes to matrix O.

The PCGP system constructs a new FROG trace from the probe vector and the magnitude of the gate vector (or a complex valued gate vector when appropriate) obtained from the SVD of the outer product form matrix. The system repeats the process (see FIG. 3) until the FROG trace error, $\epsilon_{FT}$, reaches an acceptably low value minimum.

Using SVD has an additional advantage as well. SVD provides the best packing efficiency for a given image. In other words, the image produced from the product of the outer product of the vector pair with the largest weighting factor is the best rank 1 approximation of that image in the least squares sense. That is, it minimizes $$\varepsilon^2 = \sum_{i,j=1}^{N} |E_{Outer}^{i,j} - E_{Probe}^{i} E_{Gate}^{j}|$$

where $E_{Outer}$ is the outer product form of the FROG trace shown in equation 17, $E_{Probe}$ is the probe vector, $E_{Gate}$ is the gate vector, and $\epsilon$ is the error. This shows that the probe and gate found using SVD in the method described above represents a projection found directly without minimization. Neither the set of functions with a given Fourier transform magnitude nor the set of all outer products is a convex set, however. Since one or more of the constraints applied is not a projection onto a convex set, this method is related to the technique known as generalized projections; hence, the following discussion refers to this method as a principal component generalized projections method, or PCGPM.

Implementations of the FROG inversion method using the singular value decomposition may be comparatively slow and consume time by providing information with potentially limited use. Since only the principal eigenvector pair (one left and one right) is required, these eigenvectors can be obtained by using the power method. When a matrix, O, is decomposed using SVD, the eigenvectors of $OO^T$ (probe) and $O^TO$ (gate) are found along with the eigenvalues of $OO^T$ (which are the same as $O^TO$ and are called the weighting factors). The principal vector pair is the pair with the largest weighting value or the dominant eigenvalue of $OO^T$ (or $O^TO$).

Assume a matrix O with a dominant eigenvector and $x_o$ is an arbitrary vector. If the vector is multiplied by the matrix O raised to a large power, the result is the dominant eigenvector multiplied by a constant with a negligible error. This works because the action of multiplying a vector by a matrix maps the vector onto a superposition of eigenvectors of the matrix. For example, suppose the vector $x_o$ is mapped onto a superposition of eigenvectors by matrix O. Then:

$$(O)^p x_0 = k_1 \lambda_1^{p-1} v_1 + k_2 \lambda_2^{p-1} v_2 + \ldots + k_n \lambda_n^{p-1} v_n \qquad (20)$$

where $v_1 \ldots v_n$ are the eigenvectors of matrix O and $k_1 \ldots k_n$ are constants. It follows that:

$$Ox_0 = k_1 v_1 + k_2 v_2 + \ldots + k_n v_n \qquad (21)$$

where $\lambda_1 \ldots \lambda_n$ are the eigenvalues of matrix O. The first multiplication of $x_o$ by matrix O maps $x_o$ onto a superposition of eigenvectors multiplied by constants $k_1 \ldots k_n$. Each subsequent multiplication multiplies the eigenvectors by their respective eigenvalue. If p is large enough and if $v_1$ is the dominant eigenvector, then $\lambda_1^{p-1}, \lambda_2^{p-1} \ldots \lambda_n^{p-1}$. The result will appear to be the dominant, or principal, eigenvector multiplied by a constant.

If the PCGP strategy required a large number of matrix multiplications to find the eigenvector, then little would be gained by using this method over singular value decomposition. However, the PCGP strategy works quite well by replacing the SVD step with simple matrix vector multiplies:

$$PROBE_i = OO^T (PROBE_{i-1})$$

$$GATE_i = O^T O (GATE_{i-1}) \qquad (22)$$

where i is the iteration number and O is the outer product form of the time domain FROG trace as described above. Thus, $OO^T$ maps the previous guess for the probe onto the next guess for the probe and $O^TO$ maps the previous guess for the gate onto the next guess for the gate. By replacing the SVD step by these mapping functions, the speed per iteration of the method is significantly increased while the number of iterations required for convergence is not increased. Further, the robust nature of the PCGP method is not compromised.

Cross-Correlation FROG (X-FROG)

Cross-correlation FROG (X-FROG) uses a spectrally resolved cross-correlation between a known ultrafast laser pulse and an unknown ultrafast laser pulse to characterize the unknown pulse. There are several advantages to using a known pulse to characterize an unknown pulse. Wider wavelength ranges of ultrafast laser pulses can be measured; mid-IR pulses can be mixed with pulses to shift the measurement to inexpensive detectors. Complex, wide bandwidth ultrafast laser pulses, such as continua, can be characterized. Weak pulses can be measured by being cross-correlated with high power pulses. Like FROG, the extraction of the unknown pulse characteristics in X-FROG is usually accomplished using two-dimensional phase retrieval.

In the case of X-FROG, a known reference pulse or gate function is used to interrogate an unknown pulse in a cross-correlation configuration. At each time delay between the gate and the unknown pulse, the spectrum resulting from the nonlinear interaction of the pulse and gate, rather than the intensity, is measured, which forms a true spectrogram of the unknown pulse where the gate is the gating function for the spectrogram. Since the reference pulse (gate) is known a priori, and is cross-correlated with the unknown pulse to create the X-FROG trace, extraction of the unknown pulse is easier. In the case of the standard generalized projections algorithm, where a function is minimized, the known reference pulse (gate) is just part of the minimized equation.

Applying the PCGP strategy to X-FROG it is not as straight forward because the PCGP algorithm is naturally a blind algorithm—the pulse and the gate are found independently and no a priori information about the gate is used. While blind deconvolution may be used to find both the pulse and gate, this process is prone to error especially in the case of similar pulse shapes and durations; therefore, it would be much better to use the information about the gate (known reference pulse) in a PCGP retrieval. Unfortunately, using equation 22 with a known gate (or pulse) usually causes severe stagnation and so does not typically produce an algorithm that works well. Indeed, there has been a need for years for a strategy to use a known gate in the PCGP strategy to provide an X-FROG system that does not stagnate.

One method that was attempted by Dorrer and Kang, IEEE *Photonics Technology Letters* (2004), used a blind-PCGP algorithm for three iterations and then applied the known gate. Unfortunately, this is arbitrary and the number of iterations can be higher depending on the shape of the pulse being measured and the Dorrer and Kang strategy is prone to stagnation. The strategy is also not general purpose enough to be used in a product.

SUMMARY OF THE PREFERRED EMBODIMENTS

An aspect of the present invention provides a method for determining characteristics of an unknown wave comprising providing wave phenomena data wherein the wave phenomena data comprises a reversible transform of a product of at least two waves. One of the waves is known a priori and another of the waves is unknown. The method further comprises determining characteristics of the unknown wave from the wave phenomena data by converting the known wave into the unknown wave, wherein the determining includes combining a vector representing the known wave with a vector representing an initial guess for the unknown wave.

BRIEF DESCRIPTION OF THE DRAWINGS

The accompanying drawings, which are incorporated into and form a part of the specification, illustrate several embodiments and, together with the description, serve to explain the principles of these embodiments. The drawings are illustrative and are not to be construed as limiting.

DESCRIPTION OF THE PREFERRED EMBODIMENTS

Aspects of the present invention can provide an apparatus and a method for measuring and determining characteristics of wave phenomena when one of the waves is known a priori. The apparatus includes a device for generating wave phenomena from the interaction of light or other wave sources. The interaction arises from two or more waves. When the waves interact with a medium, energy is transmitted, reflected, and/or absorbed. In some instances, the medium reflects a wave that can combine with the incident waves to produce interaction phenomena. Alternatively, the apparatus generates interaction such as second harmonic generation or sum or difference frequency generation.

Preferred implementations of the present invention may measure wave phenomena resulting from an interaction between an unknown wave or waves and a known wave. Such interactions depend on the energy and wavelength of the wave or waves. Aspects of the present invention preferably determine wave characteristics based on the interactions. A preferred implementation has the capability to represent wave phenomena data in the form of eigenvectors or singular vectors. These singular or eigenvector representations of the data typically relate to intensity and phase characteristics of a measured wave or waves. In some preferred instances, the data take the form of principal component singular or eigenvectors. Certain embodiments of the present invention preferably manipulate these vectors representing intensity and phase characteristics of a measured wave or waves using matrix vector multiplication or projections.

Particularly preferred implementations manipulate singular or eigenvectors representing intensity and phase characteristics of a measured wave or waves using power methods. One preferred manipulation uses the known wave as an input to the power method to produce a projection of the input wave onto the space of the wave phenomenon. Implementations of the present invention are not limited to matrix vector multiplications, projections or power methods for manipulating eigenvectors. For instance, a neural network can also manipulate the singular vectors or eigenvectors to provide singular vectors or eigenvectors that represent intensity and phase of measured wave or waves. In some applications, the measured interaction data are represented as an eigentensor or eigentensors. Preferred implementations also can use constraints for determining intensity and phase of wave phenomena data. For example, an implementation may use spectral constraints, intensity constraints, phase constraints, and other constraining information that aids singular vector or eigenvector formation and manipulation. Preferred implementations may provide wave phenomena data using gate and probe pulses with a time delay between the probe and gate pulses.

In a preferred aspect, an implementation determines characteristics of an unknown wave from wave phenomena data by generating a cross-correlation frequency-resolved optical gating trace from a known wave and an unknown wave. This implementation preferably then uses the known wave data, in the form of a vector, to find the unknown wave data thereby determining characteristics of the unknown wave, for example using matrix vector multiplication or projections. This implementation preferably projects the known wave onto the space of the wave phenomenon to find the unknown wave. Preferably, the projection operation uses the power method and may be, when necessary, applied in an iterative process. The implementation preferably determines wave characteristics including intensity and phase.

Preferably, implementations can determine wave characteristics where a wave can be represented as a complex or real function of one or more variables. Wave phenomena data result from multiple interactions of more than one wave with relative displacements between interactions. An interaction occurs when an invertible or reversible transformation acts on the product of two or more waves. Preferred implementations can determine wave characteristics from interactions where one of the waves is known.

When applied to ultrashort laser pulses, the results presented confirm that the modified methods of principal component generalized projections (PCGP) described here provide useful improvements over past methods. Preferred implementations can provide fast inversion speed and compact code that can run efficiently on a DSP, computer or GPU. The described implementations are well suited to run on multiprocessor computers such as those using graphics processing units.

The description now focuses on a modification of the principal component generalized projection method or PCGPM where one of the input waves is known a priori. This modified PCGPM preferably can be used to solve X-FROG phase retrieval problems.

By design, the PCGP algorithm is a blind algorithm. That is, the probe and the gate are completely independent. In the case of FROG, the pulse is typically a function of the gate. For example, assume we have a nonlinear medium that produces a gate from the input pulse via a function we will call $\Gamma$ and its inverse $\Gamma^{-1}$. If the pulse and the gate are allowed to be independent in FROG retrievals where the gate is actually a function of the pulse, significant errors in the measured pulse can result. Therefore, modifications preferably are made to make a PCGP system more applicable to FROG. Rather than using only the outer product of $E_{Probe}$ and $E_{Gate}$ to produce the next time domain FROG trace, preferred strategies use the sum of the outer products of $E_{Probe}$ and $E_{Gate}$ and $\Gamma^{-1}(E_{Gate})$ and $\Gamma(E_{Probe})$ so that the outer product on the next iteration is given by $$O_i = \text{probe}_i \otimes \text{gate}_i + \Gamma^{-1}(\text{gate}_i) \otimes \Gamma(\text{probe}_i) \quad (23)$$

where $O_i$ is the outer product matrix constructed for the ith iteration, and where $\otimes$ is the outer product operator. In the case of SHG FROG, the function that produces the gate from the probe and its inverse is trivial. For other geometries such as polarization gate, the inverse does not exist. As a result, implementations preferably construct a pseudoinverse transform for these geometries. The inverse preferably is constructed from the square root of the gate intensity and the phase of the pulse. Unfortunately, the square root is not a well behaved function. Small fluctuations in the wings of the gate can cause artifacts in the next guess for the pulse that cause instabilities in the method. PCGP implementations can remedy this by applying the square root only in portions of the gate where it is well defined. Where the gate is not well defined, the intensity (and phase) of the pulse is used. This method works well for polarization-gate FROG.

Figure 4:
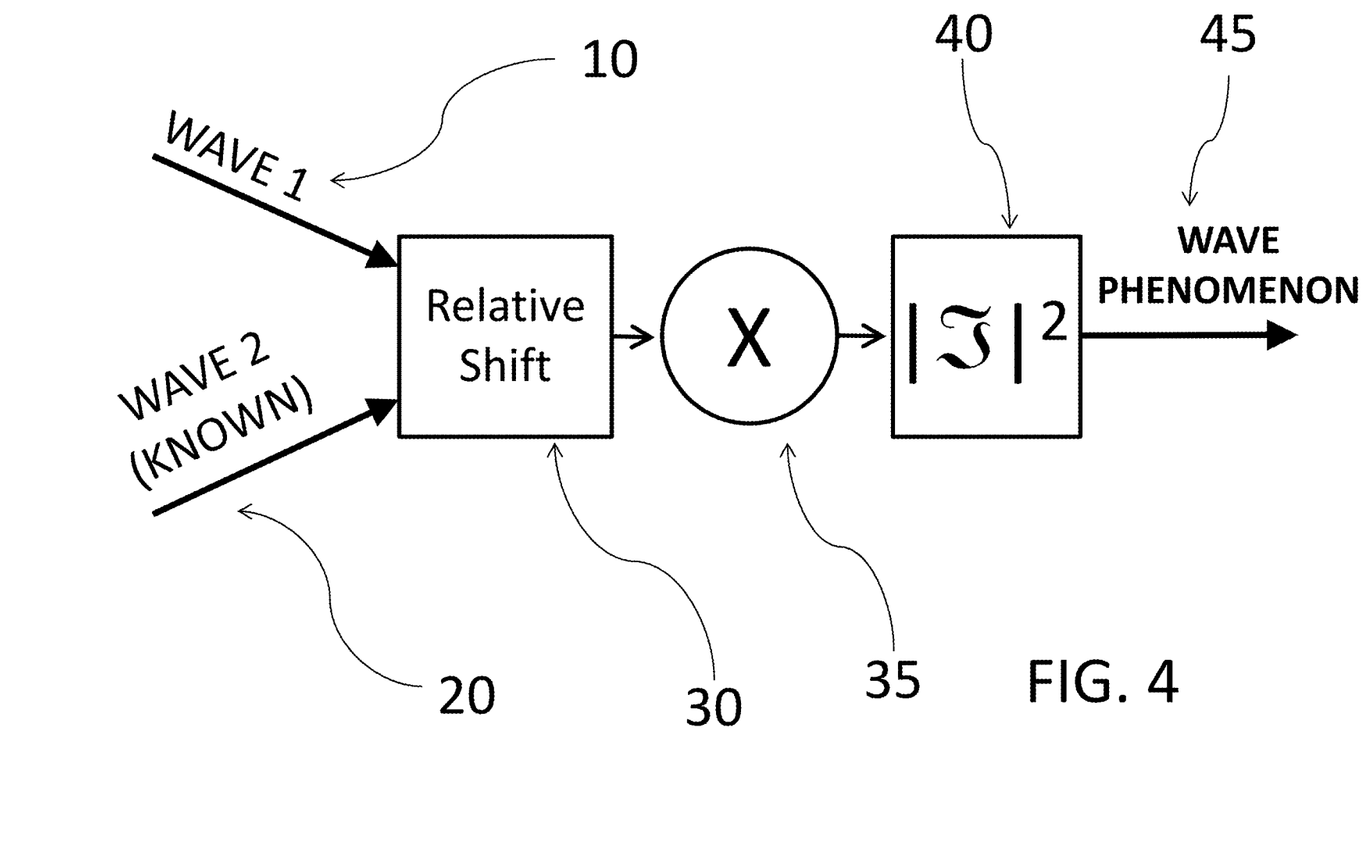
FIG. 4 shows a schematic of the type of interaction the modified PCGPM or X-PCGPM can analyze.

FIG. 4 shows a schematic of the type of interaction the modified PCGPM or X-PCGPM can analyze and characterize. The unknown wave 10 and the known wave 20 are input into a relative shift 30 before multiplying the shifted waves together 35. Examples of a relative shift include a phase shift, a temporal shift, or a spatial shift. After multiplication 35, the intensity 40 of the wave interaction is obtained, which is usually the magnitude squared of the Fourier transform in the case of Fraunhofer diffraction. Other transforms may be used, so long as the transforms are appropriately reversible to work between the domain that the intensity constraint is in and the domain in which the outer product form is stated. The result is the wave phenomenon 45. Wave phenomena data are collected for different shifts 30 between the waves 10, 20. In one preferred example, the waves 10 and 20 are unknown and known ultrafast laser pulses, respectively, the relative shift 30 is a time delay, the multiplier 35 is a second harmonic generation crystal, the intensity is detected using a spectrometer, and the output wave phenomenon 45 is a spectrogram of an X-FROG trace. In other implementations, the multiplication may be that associated with polarization gating, self-diffraction or third harmonic generation.

Determining the wave characteristics from the X-FROG trace preferably determines the best rank 1 approximation for O, the outer product form matrix obtained by reversing the process of constructing the spectrogram from the outer product form matrix after the intensity constraint (wave phenomenon) has been applied to the spectrogram. Finding the best rank 1 approximation for O is equivalent to finding the eigenvectors for $OO^T$ and $O^TO$, which are designated as v and w, respectively. These vectors are solutions to the equations:

$$OO^T v = \sigma_1^2 v$$

$$O^T O w = \sigma_1^2 w \quad (24)$$

making v and w eigenvectors of the $OO^T$ and $O^TO$, respectively. They are also singular vectors of O. In a PCGP strategy, the waves are represented by vectors so that solving for the singular vectors of O finds the wave characteristics from the wave phenomenon. The wave phenomenon preferably is applied as a constraint in the PCGP strategy, and usually takes the form of an intensity constraint. However, the PCGP strategy finds both left and right singular vectors (v and w) from O, and does not provide a good way to find one singular vector when one is known. This difficulty is addressed below in the form of a modification to the PCGP algorithm to find the other singular vector, or unknown wave characteristics, when one singular vector is known.

Figure 5:
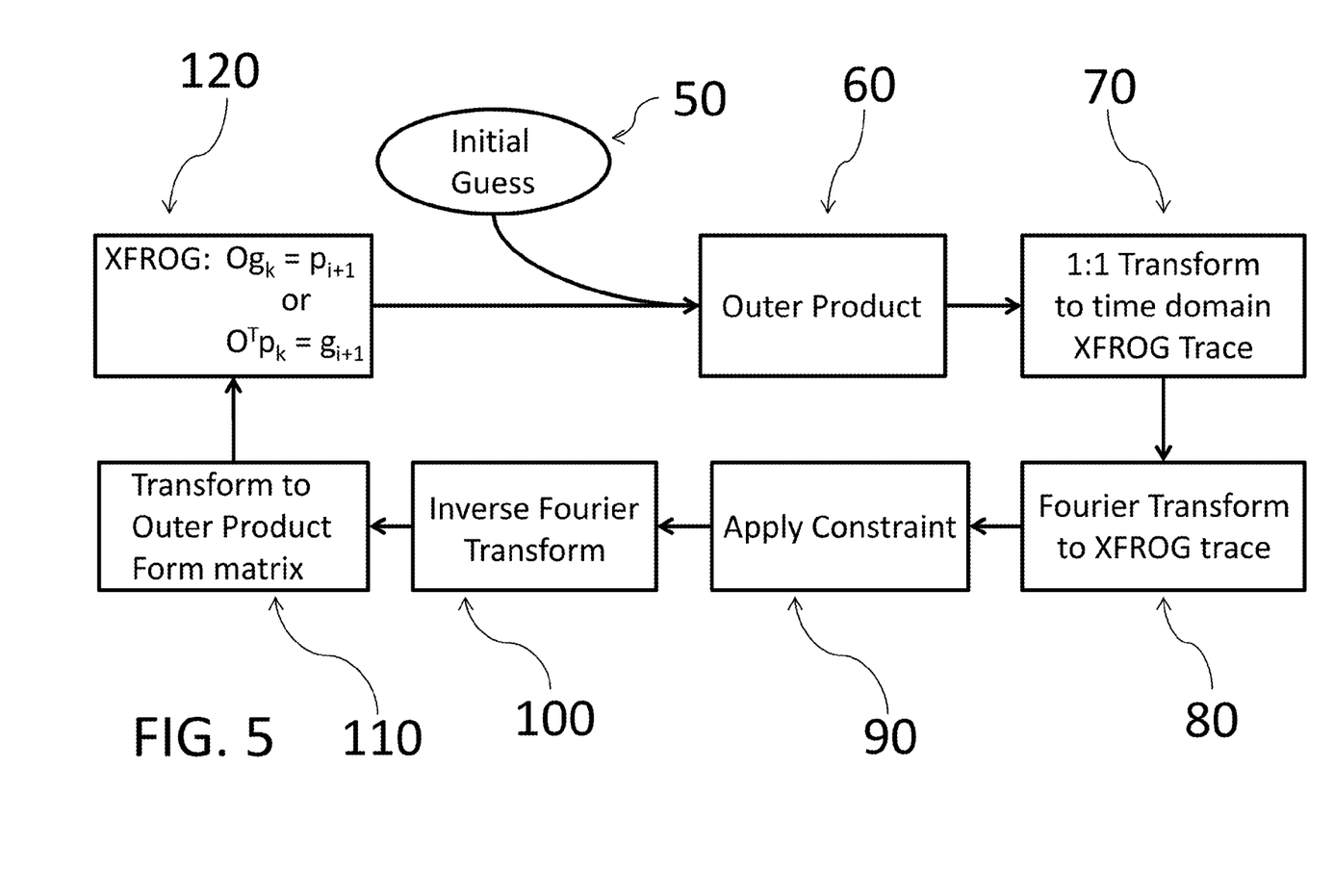
FIG. 5 is a schematic illustration of X-PCGPM phase retrieval.

For fixed choices of unit eigenvectors v and w, a best rank 1 approximation for O must be of the form $e^{i\theta}\sigma_1 vw^*$ for some $\theta$ (Horn and Johnson, *Matrix Analysis* p. 428). The scalar factor $e^{i\theta}$ must be chosen to minimize:

$$\|O - e^{i\theta}\sigma_1 vw^*\|_2^2 = \|O\|_2^2 - 2\sigma_1 Re[tr(e^{-i\theta}O(vw^*)^*)] + \sigma_1^2 \|v\|_2^2 \|w\|_2^2, \quad (25)$$

where $\theta$ is a phase constant, $\| \|_2^2$ is the $l_2$ norm (sum of the elements squared) squared, and Re is the real part. Minimizing equation 25 above is equivalent to maximizing $$Re[tr(e^{-i\theta}O(vw^*)^*)] = Re[e^{-i\theta}v^*Ow] \quad (26)$$

where tr is the trace of the matrix. Both v and w are unit eigenvectors, and $v^*Ow$ needs to be maximized. Because $\sigma_1$ is the principal eigenvalue, it is the largest eigenvalue. In addition, the optimal scale factor, $e^{i\theta}$, is given by $(v^*Ow)/\sigma_1$. Therefore, equation 26 is maximized when $Ow = e^{i\theta}\sigma_1 v$. In other words, O projects the gate, w, onto the next guess for the unknown pulse, v, within a constant phase factor, which is the basis for the X-FROG strategy. When O is not a square matrix, v and w are singular vectors. As a result, the X-PCGP method preferably generates eigenvectors or singular vectors by (FIG. 5):

$$Ow=\sigma_1 v, O^* v=\sigma_1 w \qquad (27)$$

where w is the gate or reference pulse, and v is the unknown pulse.

FIG. 5 shows a flow chart of the X-PCGPM. An initial guess 50 is supplied for the unknown wave or pulse, which usually takes the form of a noise modulated Gaussian. The outer product 60 is taken between the unknown pulse and the known gate. The outer product is transformed, preferably through rotations, into the time domain of the X-FROG trace 70. Transform 70 is identified as the 1:1 transform where the elements of the outer product matrix are rearranged to form the X-FROG trace. A Fourier transform 80 transforms the time domain X-FROG trace to the frequency domain and the magnitude of the X-FROG trace is replaced by the measured X-FROG trace (i.e., intensities) in step 90. Inverse Fourier transform 100 transforms the X-FROG trace back to the time domain. The 1:1 transform 70 is reversed 110 by reversing the rearranging of matrix elements to transform the matrix back to the outer product form. The outer product form matrix O transforms the known gate, $g_k$, into the next guess for the unknown pulse $p_{i+1}$ 120 by multiplying the gate by the matrix. Alternatively, if the gate, g, is unknown, and the pulse, p, is known, $O^T$, transforms the known pulse, $p_k$, into the next guess for the unknown gate, $g_{i+1}$. This multiplication, which implements the power method, could be repeated but in practical terms it is generally sufficient to perform the multiplication once. The resulting next guess 120 for the unknown pulse is then inserted at step 60 and steps 60 to 120 in the FIG. 5 flow are repeated until convergence. Functionally, the process illustrated by the FIG. 5 flow allows the known wave vector to be converted into the unknown wave vector.

Depending on whether w or v is the known pulse (either one can be the known or unknown quantity), only one of the equations in equation 27 should be used in the X-PCGPM retrieval, which is shown in FIG. 5. Otherwise, the algorithm may not function properly. For example, if w is known, then O projects w onto v and v⊗w (⊗ is the outer product operator) creates the next guess for O. X-PCGPM preferably applies equation 27 every iteration, which greatly favors the vector with the largest singular value or eigenvalue. The outer product preferably is constructed from a single outer product v⊗w. The outer product can be thought of as mapping the known wave, known reference, known reference pulse, known eigenvector, known singular vector or known gate onto the space of O.

X-PCGPM can be thought of in the following manner. The constraint applied to the transformed outer product of the known and unknown waves forms a space. This space is transformed into the outer product space. By multiplying the known vector by the outer product form (or transposed outer product form) matrix, the known vector is mapped onto the best approximation of a singular vector of the outer product form matrix.

The resulting system is extremely robust. Convergence testing of the X-PCGPM system was conducted using a methodology similar to that published in D. J. Kane, *IEEE J. Quantum Electron* (1999). Three different tests were conducted by constructing test pulses from filtered random noise, random chirp (including self-phase modulation), and multiple pulses. At least 500 test pulses from each category were used on a 64×64 grid. The system was run for 400 iterations for each test pulse, and convergence was assumed to be a FROG trace error of $10^{-4}$. For each test, an independent pulse and gate was constructed using the model under test. The X-PCGPM system was started using the constructed gate, and an initial guess of a noise modulated Gaussian for the pulse. The system converged 99.9% of the time, which is much better than any FROG retrieval algorithm including the polarization-gate FROG algorithm. About the only time the X-PCGPM system did not converge (2 out of 1500 trials), the frequency content of the FROG trace extended beyond the frequency pass band of the X-FROG trace.

Figure 6:
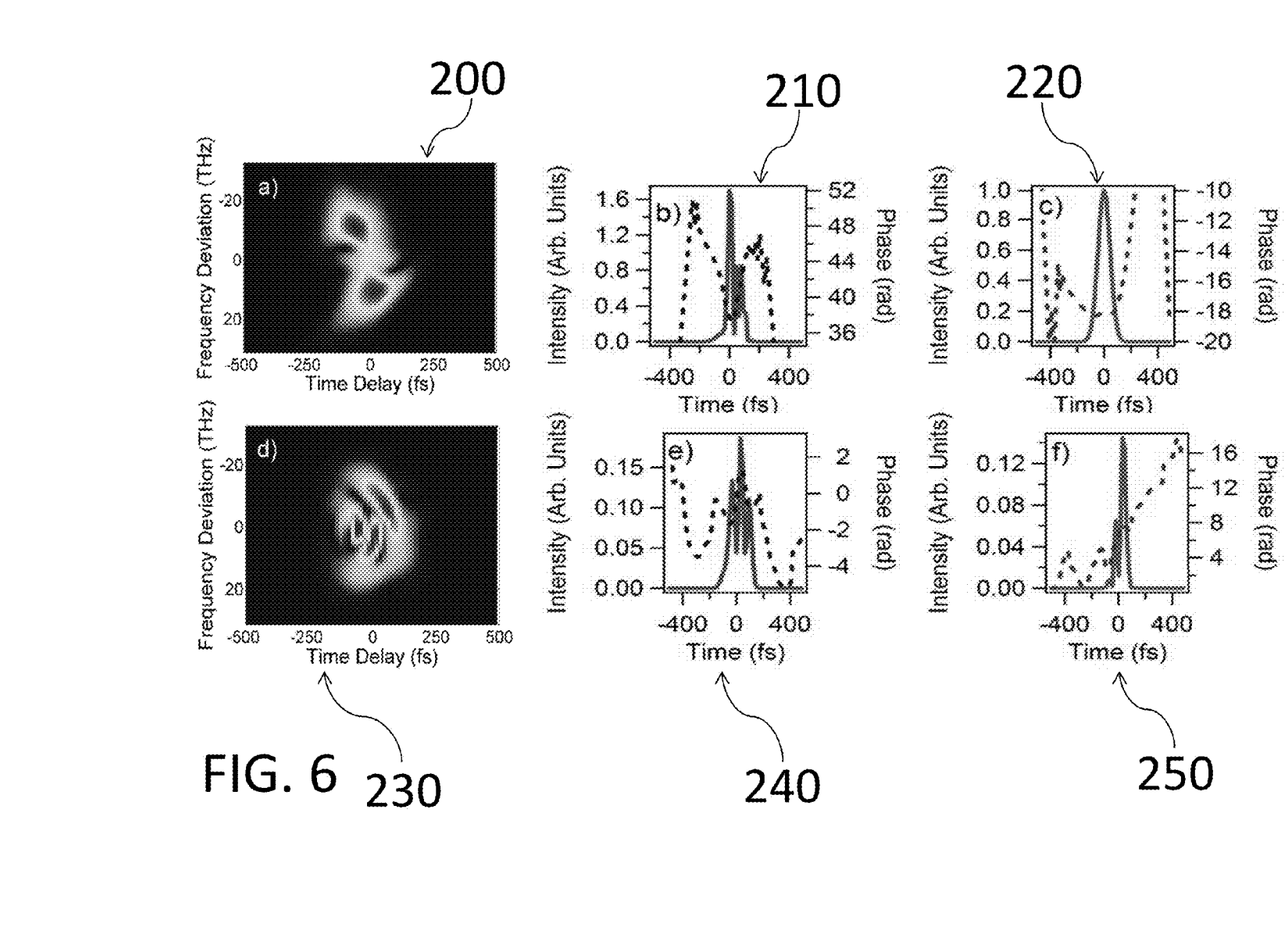
FIG. 6 illustrates a synthetic test of X-FROG phase retrieval.

FIG. 6 shows an example of synthetic test data for the X-PCGPM system (or X-PCGP, or modified PCGPM). An X-PCGPM trace 200 was inverted using the process illustrated in FIG. 4 assuming a known gate 220 to yield the unknown pulse 210. Similarly, an X-FROG trace 230 was inverted using the X-PCGPM process illustrated in FIG. 4 assuming a known gate 250 to yield the unknown pulse 240.

Figure 7:
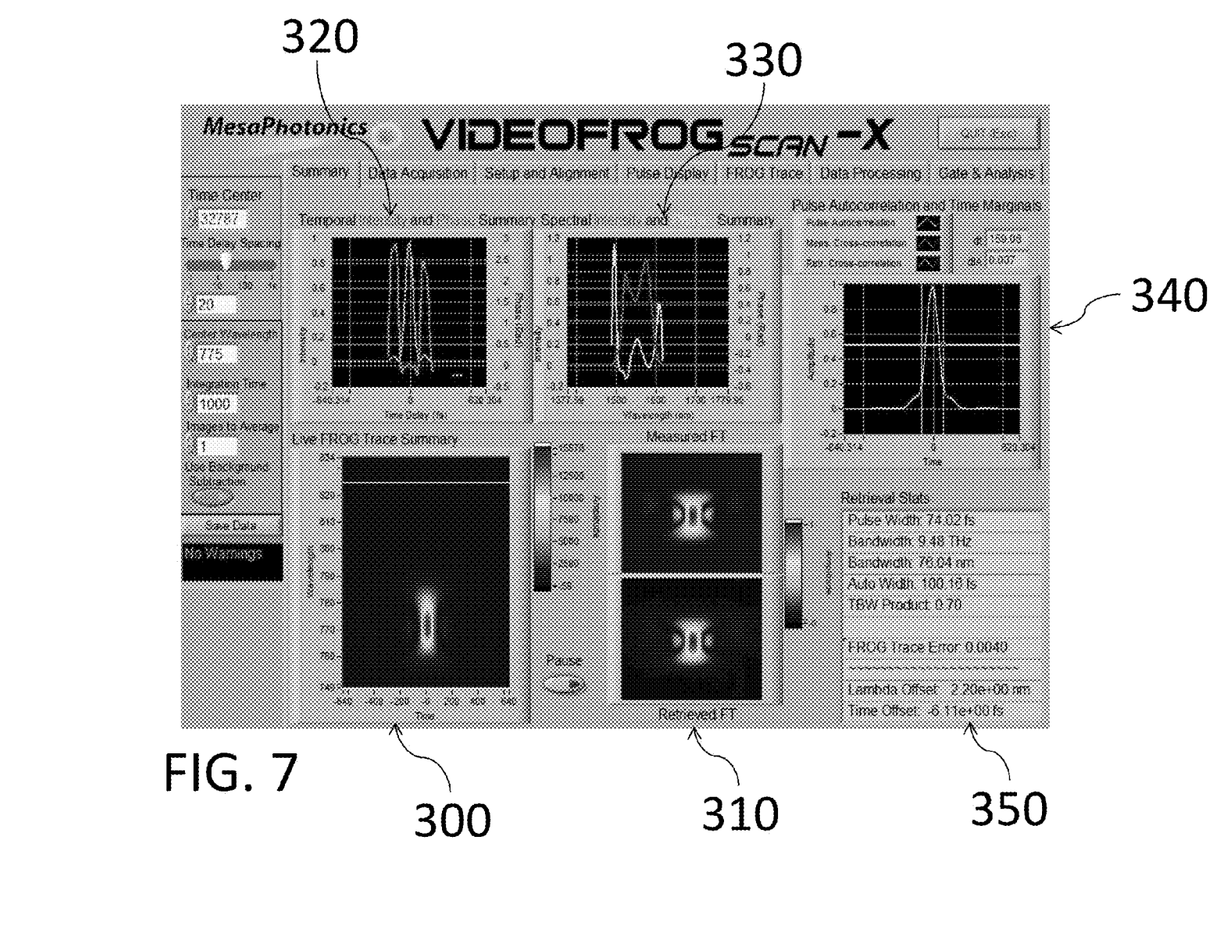
FIG. 7 illustrates a front panel of a VideoFROGscan—X software package following data acquisition and with data analysis in progress. This figure shows actual data being inverted using the X-PCGPM.

FIG. 7 shows an exemplary front panel of commercial software sold by Mesa Photonics that implements, among other things, X-PCGPM. This figure shows an example of the X-PCGPM strategy in operation and working on real data. The experimental X-FROG trace 300 is obtained from a spectrally resolved sum frequency between the unknown pulse 320 and a known gate (not shown). The frequency domain representation of the pulse 320 is shown 340. A cross-correlation 340 is also displayed along with pulse statistics 350.

Singular vector or eigenvector decompositions may also be used to find the appropriate next guess; however, the power method is so effective that it is not typically necessary.

There is no restriction on the known wave, vector, or pulse. It only needs to be able to be represented by a vector. Indeed, while X-FROG was originally developed to measure weak ultrafast laser pulses (S. Linden et al. (1998)), it was soon used to measure complex ultrafast laser pulses including continua (J. Dudley, et al., *Opt. Expr.* (2002)). Possible additional applications include using preferred implementations such as X-PCGPM in any situation where the gate could be known a priori such as frequency-resolved optical gating for complete reconstruction of attosecond bursts (FROG CRAB) or using phase modulators to characterize ultrafast laser pulses (Jiang, et al., *Opt. Comm.* (2002)). These applications might benefit from the added stability of using an X-PCGPM system rather than a blind-FROG system as is currently used. In addition, the X-PCGPM requires no constraints on the gate pulse. The known reference pulse or wave can be real, imaginary, complex, or phase only.

In the case of FROG CRAB, the attosecond XUV or X-ray pulse to be measured generates an electron wave-packet by photoionizing atoms. A femtosecond IR laser pulse can then phase modulate the electron wavepacket acting as a phase gate. The photoelectron spectrum is recorded as a function of time delay between the attosecond pulse and the femtosecond IR laser pulse. The resulting spectrogram obtained from the photoelectron spectrum is used as the spectrogram that is inverted using the blind PCGP algorithm. Because the femtosecond IR laser pulse could be characterized independently of the FROG CRAB system using standard FROG methods, the measured IR pulse, which directly represents the phase gate, could be used in an X-FROG system.

A phase gate is much easier to calibrate than an intensity gate, especially when used with phase modulators. While blind-FROG inversions can work to obtain the phase, the X-PCGPM system is much more robust and, therefore, more useful in practice.

These examples all measure wave phenomena produced by two or more waves. The wave phenomena provide the constraint, and the product (gating) is the interaction. The waves are represented as vectors or tensors for processing within the system. The wave phenomena can have a dimension of two or higher.

In the case of cross-correlation FROG, one of the waves is commonly referred to as the gate and the other as the pulse. Either can represent unknown or known wave characteristics. A nonlinear interaction acts as a multiplier to produce the product of the waves, and the product of the waves, as a function of time delay between the waves, is recorded as the wave phenomena.

Nonlinear interactions are not required for multiplication or gating. Any process that effectively multiplies can gate. For example, electronically driven phase and/or intensity modulators can be used for the multiplication or gating process where the modulator acts on the other wave, which can be light or even another electronic wave. In this case, one wave is the phase and/or intensity imparted by the modulator and the other wave is the wave that the modulator acts on. Either wave can be the known or unknown wave.

In the case of imaging, the gate can be a fully characterized laser beam (a known wave), and the probe can be an object, which is the unknown wave. The interaction can be modeled as a multiplication. The objects are tensors of order 2. The wave phenomenon can be the diffracted light from the object as a function of spatial coordinates x and y. Following Fraunhofer diffraction, the diffracted light will be the Fourier transform of the gate-probe product and is represented by a tensor of order 4 (one order 2 tensor for each spatial location). Only the intensity can be easily recorded, and can used as the constraint in the modified PCGPM to image the object.

The X-PCGP strategy can even be applied in higher dimensions to accommodate spectrograms or sonograms such as those obtained during scanning-tunneling electron microscopy, synthetic aperture radar, or confocal microscopy. Basically, these devices/techniques scan a two-dimensional gate function over a two-dimensional image in two different directions as opposed to a one-dimensional scan in the case of ultrashort pulse measurements. To apply PCGP to improve resolution of these devices, PCGP must be converted from a two-dimensional method to a four-dimensional method. Instead of a vector gate being scanned across a vector probe, a gate tensor of rank 2 is scanned in two dimensions across a rank 2 probe tensor. A two-dimensional FFT converts the time domain signal to the frequency domain. The result is a rank 4 tensor.

If a process is amenable to modeling by an invertible transformation, then input vectors are optimizable, and controllable, by the application of the modified PCGPM. Applications are not limited to purely "physical" phenomena, for example, market trading data, traffic data, and, in general, wave-like data can also be analyzed by this strategy.

Although the invention has been described in detail with particular reference to these preferred embodiments, other embodiments can achieve the same results. Variations and modifications of the present invention will be apparent to those skilled in the art. The present invention is not defined by the various embodiments described here but is instead defined by the claims, which follow.

What is claimed is:

1. A method for determining characteristics of a first electromagnetic wave, the method comprising:

providing a relative shift between a first electromagnetic wave and a second electromagnetic wave, the relative shift controlled to provide a sequence of shifts between the first electromagnetic wave and the second electromagnetic wave;

multiplying the first electromagnetic wave with the second electromagnetic wave following each of the sequence of shifts to provide a sequence of multiplied output electromagnetic waves;

measuring, by an electronic detector coupled to a digital computer, an intensity for each of the sequence of multiplied output electromagnetic waves to provide a sequence of detected wave values as detected wave phenomena data;

generating, by a processor of the digital computer, generated wave phenomena data based on a reversible transform of a product of at least first and second generated waves, the second generated wave based on known information about the second electromagnetic wave; and determining, by the processor of the digital computer, characteristics of the first electromagnetic wave from the generated wave phenomena data by applying the detected wave phenomena data as a constraint to the generated wave phenomena data to develop a projection operator, applying the projection operator to one of the first or second generated waves to project the one of the first or second generated waves into a space of the other of the first or second generated waves to provide an estimate of the other of the first or second generated waves, and generating further generated wave phenomena data using the estimate.

2. The method according to claim 1 wherein the determining comprises using principal component general projections.

3. The method according to claim 1 wherein the determining comprises solving for an unknown singular vector using a power method.

4. The method according to claim 1 wherein the determining comprises projecting the second generated wave onto the first generated wave.

5. The method according to claim 4 wherein the projecting uses the power method.

6. The method according to claim 1 wherein the determining comprises projecting the first generated wave onto the second generated wave.

7. The method according to claim 1 wherein the relative shift is a phase shift, a temporal shift or a spatial shift.

8. The method according to claim 1 wherein the multiplying comprises second harmonic generation, third harmonic generation, polarization gating or self-diffraction.

9. The method according to claim 1 further comprising displaying aspects of the first electromagnetic wave based on the characteristics of the first electromagnetic wave.

10. The method according to claim 9 wherein the method performs frequency resolved optical gating and wherein the wave phenomenon is a spectrogram.

11. The method according to claim 10 further comprising displaying the spectrogram.

12. The method according to claim 11 wherein the relative shift is a phase shift, a temporal shift or a spatial shift.

13. The method according to claim 10 further comprising displaying aspects of the first electromagnetic wave based on the characteristics of the first electromagnetic wave.

14. The method according to claim 9 wherein the determining comprises projecting the second generated wave onto the first generated wave.

15. The method according to claim 9 wherein the determining comprises projecting the first generated wave onto the second generated wave.

16. The method according to claim 9 wherein the multiplier is a second harmonic generation material, the wave phenomena data is detected by a spectrometer and the wave phenomena data is a spectrogram.

17. The method according to claim 1 further comprising:
generating the first electromagnetic wave by reflecting or refracting an input wave off an object so that characteristics of the object modulate the input wave, wherein the relative shift is a spatial shift; and
displaying aspects of the object by processing the first electromagnetic wave.

18. The method according to claim 1 wherein the multiplying is performed by a multiplier, the wave phenomena data is detected by a spectrometer and further comprising displaying aspects of the first electromagnetic wave based on the characteristics of the first electromagnetic wave.

19. The method according to claim 18 wherein the multiplier is a nonlinear material.

20. The method according to claim 18 wherein the wave phenomena data is a spectrogram.

21. A method for determining characteristics of a first electromagnetic wave, the method comprising:
providing a relative shift between a first electromagnetic wave and a second electromagnetic wave, the relative shift controlled to provide a sequence of shifts between the first electromagnetic wave and the second electromagnetic wave;
multiplying the first electromagnetic wave with the second electromagnetic wave following each of the sequence of shifts to provide a sequence of multiplied output electromagnetic waves;
measuring, by an electronic detector coupled to a digital computer, an intensity for each of the sequence of multiplied output electromagnetic waves to provide a sequence of detected wave values as detected wave phenomena data;
generating, by a processor of the digital computer, generated wave phenomena data based on a reversible transform of a product of at least first and second generated waves, the second generated wave based on known information about the second electromagnetic wave;
determining, by the processor of the digital computer, characteristics of the first electromagnetic wave from the generated wave phenomena data by applying the detected wave phenomena data as a constraint to the generated wave phenomena data to develop a projection operator, applying the projection operator to the first generated wave to project the first generated wave into a space of the second generated wave to provide an estimate of the second generated wave, and generating further generated wave phenomena data using the estimate.

22. The method according to claim 21 further comprising displaying aspects of the first electromagnetic wave based on the characteristics of the first electromagnetic wave.

23. The method according to claim 22 wherein the further generated wave phenomena data is generated using the projected first generated wave and the known information about the second electromagnetic wave.

24. The method according to claim 23 wherein the relative shift is a phase shift, a temporal shift or a spatial shift.

25. The method according to claim 23 wherein the multiplying comprises second harmonic generation, third harmonic generation, polarization gating or self-diffraction.

26. The method according to claim 25 wherein the multiplying is performed by a second harmonic generation material or a third harmonic generation material.

27. The method of claim 25 wherein the method performs frequency resolved optical gating and the wave phenomena data is detected by a spectrometer.

* * * * *